United States Patent [19]

Kurki et al.

[11] Patent Number: 4,671,097
[45] Date of Patent: Jun. 9, 1987

[54] CALIBRATION SYSTEM FOR THE CALIBRATION OF MASS FLOW CONTROLLERS

[75] Inventors: Jouko Kurki, Alkutie; Örjan Sandvik, Hulluksentie; Tiina Nyrkiö-Mäklin, Gresantie, all of Finland

[73] Assignee: Oy Nokia AB, Helsinki, Finland

[21] Appl. No.: 842,257

[22] PCT Filed: Jun. 14, 1985

[86] PCT No.: PCT/FI85/00053
§ 371 Date: Feb. 14, 1986
§ 102(e) Date: Feb. 14, 1986

[87] PCT Pub. No.: WO86/00153
PCT Pub. Date: Jan. 3, 1986

[30] Foreign Application Priority Data
Jun. 15, 1984 [FI] Finland ................................ 842441

[51] Int. Cl.$^4$ .............. G01F 25/00; G05D 7/00; G12B 13/00
[52] U.S. Cl. ......................................... 73/3; 364/510; 364/571
[58] Field of Search ............ 73/3; 364/500, 510, 364/565, 571, 573

[56] References Cited

U.S. PATENT DOCUMENTS

| | | | |
|---|---|---|---|
| 4,096,746 | 6/1978 | Wilson et al. | 73/3 X |
| 4,276,243 | 6/1981 | Portus | 73/204 X |
| 4,341,107 | 7/1982 | Blair et al. | 73/3 |
| 4,436,674 | 3/1984 | McMenamin | 73/861.04 X |
| 4,565,092 | 1/1986 | Kompelien | 73/3 X |
| 4,566,307 | 1/1986 | Boykin | 73/3 |

FOREIGN PATENT DOCUMENTS 2054204 2/1981 United Kingdom ................ 73/3

Primary Examiner—Stewart J. Levy
Assistant Examiner—Tom Noland
Attorney, Agent, or Firm—Frost & Jacobs

[57] ABSTRACT

A calibration system for the calibration of mass flow controllers of an apparatus used for a chemical vapor phase growth, comprising at least one mass flow meter for measuring the characteristics of the mass flow controllers and a computer for calculating correction coefficients for the different controllers. The system preferably comprises at least one flow meter for measuring at least the adjoining ranges of the mass flow controllers covering adjacent flow ranges.

3 Claims, 5 Drawing Figures

GAS FLOW

CONTROL VOLTAGE

GAS FLOW

CONTROL VOLTAGE

CALIBRATION SYSTEM FOR THE CALIBRATION OF MASS FLOW CONTROLLERS

BACKGROUND OF THE INVENTION

The invention relates to a calibration system for the calibration of mass flow controllers of an apparatus used for a chemical vapor phase growth.

The techniques of chemical vapor phase growth are used generally in semi-conductor industries and in connection with the production of optic fibers (MCVD modified chemical vapor deposition-technique, OVPO outside vapor phase oxidation-technique, VAD vapor phase axial deposition-method and the like). Apparatuses applying said methods comprise vapor channels intended for different materials (such as $SiCl_4$, $GeCl_4$, $POCl_3$, $BBr_3$) and including mass flow controllers.

A conventional apparatus for controlling a vapor flow and for the transportation thereof into a system to be used is illustrated in FIG. 1. Therein a carrier gas, e.g., oxygen, is passed through a stop valve C to a mass flow controller M. This passes the gas flow into a bubbler B, i.e. inside a liquid F contained therein.

The empty upper portion of the bubbler B is filled with a saturated (or at least by near saturated) vapor of the used liquid F. The carrier gas carries the vapor into the using system. In an ideal case, the vapor flow rate Q (moles/min) is $$Q = \frac{Pi \cdot P}{(P - Pi)RT} \cdot K \cdot V \qquad (1.)$$

wherein Pi is the vapor pressure of the liquid at the used temperature (T), P is the total bubbler pressure, R a general gas constant, T the absolute temperature, K a factor dependent on the coefficient of efficiency of the vaporization and V a carrier gas flow rate (standard l/min). So the amount of vapor can be regulated by controlling the carrier gas flow rate V.

This in turn can be effected by means of a thermal mass flow controller M wherein the gas flow rate in an ideal case is directly proportional to the control voltage. (Such devices are commercially available, manuf. Tylan and Brooks, e.g.). A conventional characteristic of a mass flow controller (gas flow rate as a function of the control voltage) is shown in FIG. 2, in which a curve a shows an ideal characteristic and a curve b an actual characteristic.

A vapor control system of the type described is more advisable than a flow controller based on direct measuring of the amount of vapor (a so called source controller, e.g., Source V, manuf. Tylan). The thermal conductivity of the carrier gas and the vapor is therein measured by means of a special measuring element which comprises parts which are usually made of stainless steel. However, the chemicals used in the production of optic fibers, e.g., cause corrosion in the metal parts and dissolved metals may deteriorate the quality of the fiber. Corrosion also brings about a change in the characteristic of the apparatus, whereby the controller does not operate properly. The controller also requires frequent cleaning and must be calibrated thereafter. The above-mentioned disadvantages are referred to also in U.S. Pat. No. 4,436,674.

In FIG. 2, the curve b shows the characteristic of a thermal mass flow controller. As to the shortcomings, there is, among others, the offset value o (typically approx. 2%). Also the fullscale flow fs (e.g. 1000 ml/min) may deviate from the normal value in commercially available controllers. In optic fiber production, a wide linear range of control as well as an accurate control over the whole range are of importance.

As illustrated in FIG. 2, commercially available mass flow controllers are not ideal, which may lead, e.g., in a situation illustrated in FIG. 3, wherein the upper and lower limiting values of the controllers 1 and 2 deviate from each other, causing discontinuity in the control process. On the other hand, the operation of the controllers is not completely linear, either. In addition, replacing with a new one or cleaning of some of the controllers may cause rather a wide variation in the characteristic.

Besides, practice has shown that already very small deviations in the operation of the controllers may result in highly disadvantageous changes in such properties of e.g. the preform of a MCVD optic fiber as an index of refraction profile, a numeric aperture, geometry, etc. These deviations, maybe minor as such, can, however, have an extremely great effect on the critical properties of the fiber, particularly on the band width, attenuation and geometry. Consequently, not even the deviation $\pm 1\%$ guaranteed for the controller on the maximum limit can always be regarded as acceptable.

SUMMARY OF THE INVENTION

The elimination of the problems mentioned above has been achieved by means of the present calibration system, which is characterized in that it comprises at least one mass flow meter for measuring the characteristics of the mass flow controllers and an apparatus for calculating correction coefficients for the different controllers. Said system preferably comprises at least one flow meter for measuring the flow range of one mass flow controller or at least the adjoining ranges of mass flow controllers covering adjacent flow ranges.

BRIEF DESCRIPTION OF THE DRAWING

The system according to the invention will be described in the following in more detail with reference to the attached drawings, wherein.

DESCRIPTION OF THE PREFERRED EMBODIMENTS

Figure 4:
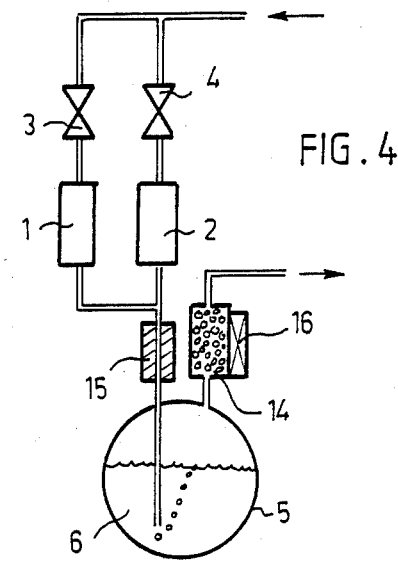
FIG. 4 illustrates the principle of a CVD vapor directing apparatus used in the invention.
Figure 2:
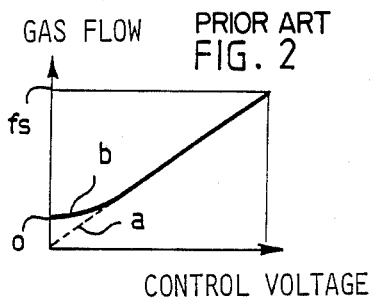
FIG. 2 shows a characteristic of an ideal and an actual mass flow controller.
Figure 3:
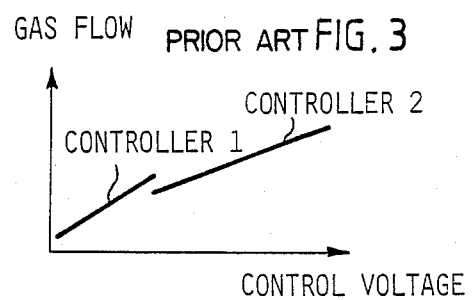
FIG. 3 shows the characteristics of two controllers included in the same system.

The principal structures of the apparatus used in the invention is illustrated in FIG. 4. Said figure shows two parallel mass flow controllers 1 and 2 and stop valves 3 and 4 attached thereto, whereby said controller 1 is intended for minor flow rates and said controller 2 for major flow rates, whereby the characteristics thereof can be similar to those according to FIG. 3, for instance. Oxygen or some other corresponding gas is fed through said controllers 1 and 2 into a bubbling bottle (bubbler) 5 containing, e.g., $SiCl_4$ or some other corresponding halide 6, whereby a flow formed by the gas and the halide is discharged from the bubbling bottle, in which flow the amount of halide is proportional to the gas flow passed into the bubbling bottle in certain conditions according to the formula 1.

The bubbler 5 is shown to further comprise a so called condenser 14 which is provided with an electrical or a water bath heating unit 16 and by means of which a more accurate control is achieved, said control being more independent of, for instance, the variation in the surface level of the bubbler 5 and the temperature of the bubbler. When using the condenser 14, the temperature of the bubbler 5 slightly exceeds that of the condenser 14 in such a manner that even if the vapor contained in the empty space of the bubbler is not saturated by 100%, the lower temperature of the condenser ensures that the vapor is saturated by 100% at that temperature. Thus the vapor flow rate is directly proportional to the carrier gas flow rate and error due to a variation in the surface level and/or the temperature of the bubbler, for instance, is eliminated, assuming that the temperature of the condenser 14 is stable and sufficiently lower than that of the bubbler.

In addition, the system can comprise a carrier gas heating system 15 which is operated electrically or by means of water, for instance, and by means of which a temperature change (usually cooling) in the bubbler 5, which change is caused by the vaporization or a wrong temperature of the gas, can be compensated by introducing heat or extracting heat by means of the gas into or from the liquid contained in the bubbler. In its more usual embodiment, said apparatus is a heat regulating system (e.g., an electrical heating or water bath) built around a steel tube which transfers gas and by means of which system the gas contained in the tube is brought into a required determined temperature.

Figure 5:
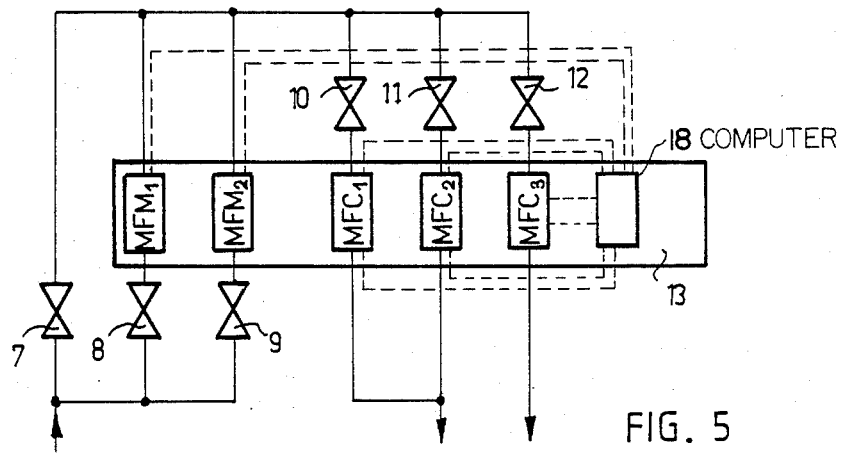
FIG. 5 illustrates the principal structure of the calibration system according to the invention.

The system illustrated in FIG. 5 comprises three parallel branches for the gas passed therein, said branches being provided with stop valves 7, 8 and 9. The valves 8 and 9 comprise mass flow meters $MFM_1$ and $MFM_2$ used in the calibration process, the measuring ranges of said meters complementing each other. During a normal use, the gas flow is passed through the valve 7. Thereafter the flow is led through the stop valves 10, 11 and 12 into the mass flow controllers $MFC_1$, $MFC_2$ and $MFC_3$, whereby $MFC_1$ and $MFC_2$ are connected in parallel. The mass flow meters $MFM_1$ and $MFM_2$ and the mass flow controllers $MFC_1$, $MFC_2$ and $MFC_3$ are positioned on a common tempered base 13, on which at least the mechanical and, to a great extent, also the electronic parts of all the devices are maintained at constant temperature so as to eliminate the errors caused by variation in temperature.

The system includes means, e.g., a computer 18, by means of which the characteristics of each mass flow controller is determined point by point, for instance. These measured properties enable the determination of correction factors for correcting the operation of the mass flow controllers into the ideal. In this way, when using a certain control voltage (flow rate value), the controllers are corrected by the calculated correction in order to obtain the ideal flow rate value. Standard mass flow meters can be used as mass flow meters, because the relative proportions and, on the other hand, a seamless joining of the control ranges of controllers having different flow ranges are essential for the process. This is achieved, first, by testing the controllers of different materials by means of the same meter (possibly using the same gas (nitrogen) and by calculating the final calibration coefficient of the used gas by means of the physical coefficients of the gas) and, second, by testing at least the adjoining ranges of controllers covering adjacent flow ranges by means of the same meter, too. Thus the errors caused by the possible inaccuracy of the mass flow meters can be essentially eliminated.

By means of the system, all the controllers or, in connection with the replacing or cleaning of a controller, this controller only can be calibrated, whereby also the effect of the replacement of a controller on the quality of the product can be eliminated. The quality of the fiber can be improved by means of the system even to such an extent that band widths which are four to six times higher than previously are easily obtained. Also the accuracy and the reproducibility of the process are improved, whereby, for instance, the flow sequences used in the fiber production can be transferred from one device to another. Because the calibration can be completely carried out by means of a computer (wherein the calibration values are stored), it can be effected quickly and accurately so that one or a few accurate mass flow meters make the whole apparatus accurate by means of the calibration process.

The apparatus shown in FIGS. 4 and 5 and the calibration system attached thereto provide an accurate absolute flow rate control and a wide linear control range required from a CVD vapor system, for instance, in the production of optic fibers, by means of commercially available standard mass flow controllers which are advantageous in price.

In particular, a fully continuous control is provided at a point in which the mass flow controller of the lowest flow is replaced with the controller of an upper flow. This is one of the most important advantages achieved by means of the apparatus according to the invention, because even a minor error may cause discontinuity in the index of refraction distribution of the optic fiber. This in turn may manifoldly deteriorate the band width of the fiber.

Figure 1:
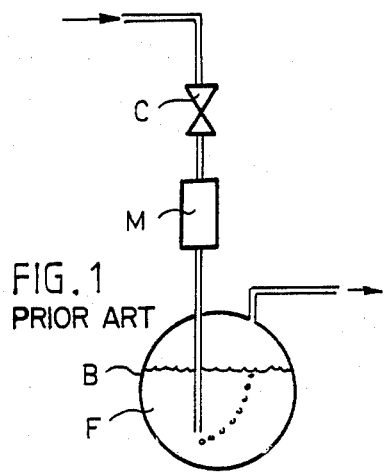
FIG. 1 illustrates a system according to the prior art.

When compared with the conventional apparatus of FIG. 1, an accurate control is achieved within a wide flow rate, whereby the index of refraction of the optic fiber e.g. is made accurately appropriate in shape. This enables the optic fiber to possess, among others, an essentially higher band width.

We claim:

1. In a calibration system for the calibration of mass flow controllers of an apparatus used for a chemical vapor phase growth, said system including mass flow meters for measuring the mass flows through said mass flow controllers, and means for calculating and storing correction coefficients for the different controllers whereby linear characteristics can be obtained for said controllers, the improvement wherein at least one of said mass flow meters occupies a measuring range covering at least adjoining ranges of two said mass flow controllers covering adjacent flow ranges.

2. The improvement claimed in claim 1, wherein at least two said mass flow meters occupy adjacent measuring ranges for obtaining a wider linear control range for said two mass flow controllers covering adjacent flow ranges.

3. The improvement claimed in claim 1, wherein at least some parts of said mass flow meters and said mass flow controllers are positioned on a common tempered base.

* * * * *